United States Patent
Hadrath et al.

(10) Patent No.: US 9,249,951 B2
(45) Date of Patent: Feb. 2, 2016

(54) LENS HAVING AN INTERNAL REFLECTION LAYER

(71) Applicant: OSRAM GMBH, Munich (DE)

(72) Inventors: Stefan Hadrath, Falkensee (DE); Ulrich Hartwig, Berlin (DE); Henning Rehn, Berlin (DE)

(73) Assignee: OSRAM GmbH, Munich (DE)

( * ) Notice: Subject to any disclaimer, the term of this patent is extended or adjusted under 35 U.S.C. 154(b) by 0 days.

(21) Appl. No.: 14/404,894

(22) PCT Filed: Apr. 29, 2013

(86) PCT No.: PCT/EP2013/058927
§ 371 (c)(1),
(2) Date: Dec. 1, 2014

(87) PCT Pub. No.: WO2013/178415
PCT Pub. Date: Dec. 5, 2013

(65) Prior Publication Data
US 2015/0124428 A1    May 7, 2015

(30) Foreign Application Priority Data
May 31, 2012 (DE) .......................... 10 2012 209 172

(51) Int. Cl.
| | |
|---|---|
| F21V 13/14 | (2006.01) |
| G02B 19/00 | (2006.01) |
| F21S 8/10 | (2006.01) |
| F21K 99/00 | (2010.01) |
| F21Y 101/02 | (2006.01) |

(52) U.S. Cl.
CPC . *F21V 13/14* (2013.01); *F21K 9/50* (2013.01); *F21S 48/1145* (2013.01); *F21S 48/1323* (2013.01); *F21S 48/1329* (2013.01); *F21S 48/1394* (2013.01); *G02B 19/0028* (2013.01); *G02B 19/0047* (2013.01); *F21Y 2101/02* (2013.01); *F21Y 2101/025* (2013.01)

(58) Field of Classification Search
USPC ..................... 362/84, 311.02, 311.06, 311.08
See application file for complete search history.

(56) References Cited

U.S. PATENT DOCUMENTS

| | | | | |
|---|---|---|---|---|
| 2007/0085105 | A1* | 4/2007 | Beeson | H01L 33/58 257/100 |
| 2010/0067216 | A1* | 3/2010 | Li | C09K 11/0883 362/84 |
| 2011/0216550 | A1 | 9/2011 | Koike et al. | |
| 2011/0249436 | A1 | 10/2011 | Li et al. | |
| 2012/0106127 | A1* | 5/2012 | Hattori | F21K 9/135 362/84 |
| 2014/0111984 | A1* | 4/2014 | Rodgers | F21V 5/005 362/231 |
| 2014/0328048 | A1* | 11/2014 | Streppel | F21K 9/135 362/84 |

FOREIGN PATENT DOCUMENTS

WO    WO 2009/131126    10/2009

\* cited by examiner

*Primary Examiner* — Laura Tso
(74) *Attorney, Agent, or Firm* — Cozen O'Connor

(57) ABSTRACT

A lens (12; 32; 42; 52) comprising a transparent main body (13; 43; 53), wherein a surface (14, 15; 14, 45; 54, 55) of the main body (13; 43; 53) is at least partly covered with an internally reflecting reflection layer (17), the lens (12; 32; 42; 52) has at least one first focal point (F1) and at least one second focal point (F2), at least the first focal point (F1) lies at least partly on a non-covered surface region of the main body (15; 45; 55), and at least one phosphor element (18) bears against the main body (13; 43; 53) at a contact region (19) having at least one first focal point (F1).

14 Claims, 4 Drawing Sheets

US 9,249,951 B2

LENS HAVING AN INTERNAL REFLECTION LAYER

RELATED APPLICATIONS

This is a U.S. National Phase Application under 35 USC 371 of International Application PCT/EP2013/058927 filed on Apr. 29, 2013.

This application claims the priority of German application no. 10 2012 209 172.6 filed May 31, 2012, the entire content of which is hereby incorporated by reference.

FIELD OF THE INVENTION

The invention relates to a lens comprising a transparent main body, wherein a surface of the main body is at least partly covered with an internally reflecting reflection layer, and the lens has at least one first focal point and at least one second focal point. The invention is applicable, in particular, in vehicle lighting, in particular with a headlight, and to image projection (e.g. for a video projector, etc.), industrial image processing, and to medical lighting and diagnosis applications.

BACKGROUND OF THE INVENTION

WO 2011/127286 A1 discloses lighting devices which use primary or excitation light and a wavelength-converting phosphor for lighting purposes, wherein the phosphor is excited by a plurality of excitation light sources from both sides in order to achieve an increased brightness. The excitation light incident on both sides can have the same color or different colors. Light-separating structures are provided on both sides of the phosphor in order to separate the excitation light and the (secondary) light wavelength-converted by the phosphor. In one configuration, a second light-separating structure in the form of an ellipsoidal hollow reflector having a small window may be present. The phosphor is arranged at or near one focal point of the hollow reflector, and a light collecting element is arranged at or near another focal point of the hollow reflector. The excitation light is radiated through the window onto the phosphor. The converted light is reflected onto the light collecting element by means of the hollow reflector.

US 2007/019408 A1 discloses a lighting device comprising a color wheel covered with phosphor, for producing colored light. In one configuration, the lighting device comprises, in addition to the color wheel, a reflector, a light source and a light collecting element. The reflector may be embodied as an optically light-transmissive element, e.g. composed of glass or plastic, having a first and a second curved surface. The first surface may have a recess for accommodating the light source, while the second, e.g. ellipsoidal, surface is a reflective surface that is reflective to the (primary) light from the light source but is transmissive to the (secondary) light converted by the phosphor of the color wheel. Light radiated from the light source through the reflector is reflected for this purpose onto the color wheel rotating at a distance below the optically light-transmissive element.

SUMMARY OF THE INVENTION

One object of the present invention is to at least partly overcome the disadvantages of the prior art.

This and other objects are achieved in accordance with one aspect of the present invention directed to a lens comprising a transparent body ("main body"), wherein a surface of the main body is at least partly covered with an internally reflecting reflection layer. An internally reflecting reflection layer can be understood to mean, in particular, a layer having at least one surface which is reflective in the direction of the main body. In this context, optically transparent may mean, in particular, that the transparent main body is optically transmissive at least both to the primary radiation and to the secondary radiation (conversion radiation). The main body can consist, for example, of glass (e.g. BK7 glass, quartz glass or sapphire glass) or of a plastic.

The reflection layer can be a single-layered or multilayered layer, e.g. a single-layered silver or aluminum layer or a multilayered silver and/or aluminum layer (e.g. MIRO or MIRO-SILVER) or a multilayered interference layer stack.

The lens (in particular as a combination of the transparent main body and the reflection layer) further has at least one first focal point and at least one secondary focal point. "At least one focal point" can be understood to mean, in particular, an individual focal point or a multiplicity of (two or more) focal points. A focal point can be understood to mean, in particular, an (at least virtually) punctiform focal point. However, a focal point can be understood to mean a one-dimensionally extended focal region, e.g. a closed or non-closed line. Such a line can also be understood as a continuous juxtaposition of possible punctiform focal points. A (focal) line can appear, for example, in the case of a lens configured circularly symmetrically, to be precise as a ring-shaped line of the possible focal points arising as a result of rotation about the rotation axis. In addition, a focal point can be understood to mean a two-dimensionally extended focal region, e.g. a focal spot. The fact that the lens has the at least one focal point can mean, in particular, that said at least one focal point can be realized by means of the lens, but need not necessarily be realized in the interplay of a lighting device that utilizes the lens.

Furthermore, at least one first focal point lies at least partly on a surface region of the main body that is not covered (by the reflection layer). The lens furthermore comprises at least one phosphor element which bears against the main body at a contact region (that is to say in particular areally) having at least one first focal point. Therefore, the at least one focal point of the contact region also lies, in particular, in an interface between the main body and the phosphor element. This affords the advantages that, firstly, waste heat from the phosphor element can be dissipated effectively via the lens, which then also serves as a heat spreading element or heat sink, and, secondly, multiple, lossy light reflections at interfaces (in particular with air), such as would otherwise occur in the case of a color wheel, for example, are avoided.

A phosphor element can be understood to mean, in particular, a body comprising one or a plurality of phosphors. A phosphor can convert, in particular, incident (excitation or primary) light having a specific wavelength or in a specific wavelength range (e.g. blue light) into secondary light having typically a longer wavelength (e.g. red or green light), wherein waste heat is generated in the form of so-called Stokes heat, which can be dissipated here through the main body. The phosphor element can be e.g. a body adhesively bonded onto the main body, e.g. a ceramic phosphor lamina or a lamina comprising phosphor as filling material of a transparent matrix material (e.g. silicone). The phosphor element may also be or comprise a metal phosphate.

The phosphor element can be applied to the main body, for example, by sintering, wringing, by means of hydrogen bridge bonds, by means of EPD methods (for example using an optically transparent, conductive interlayer such as an ITO layer), spraying, printing (e.g. by means of blade coating), etc. The phosphor element may also be a region which is integrated into the main body and in which the phosphor is present as an admixture within this region, which can be carried out by means of a sol/gel method, for example.

Secondary light emitted by a phosphor element passes through the main body, impinges at least partly on the reflection layer and from there subsequently, since the contact region has at least one first focal point, is focused onto at least one second focal point. As a result of targeted incidence of primary light on the at least one phosphor element, therefore, at least secondary light can be coupled out at the second focal point (or in the vicinity thereof).

In one configuration, therefore, the reflection layer is reflective at least to secondary light generated by the at least one phosphor element.

The reflection layer may be transmissive to the primary light, in principle, e.g. for the case of a complete conversion of primary light into secondary light (full conversion), in which primary light is radiated with incidence on the lens in particular over a large area. The reflection layer may alternatively be reflective to primary light, such that a primary light portion to be coupled out is also precisely adjustable.

The phosphor element can convert the incident primary light for example at least substantially completely (e.g. with a degree of conversion of more than 95%) into secondary light (full conversion). The secondary light can have a plurality of wavelengths if a plurality of phosphors are present. However, the phosphor element may also convert the incident primary light only partly into secondary light (partial conversion). Non-converted primary light is typically emitted again by the phosphor element, e.g. diffusely. If the reflection layer is transmissive to the primary light, the primary light may emerge from the lens again in particular without being used. If the reflection layer is reflective to the primary light, a mixture of primary light and secondary light may be coupled out at the second focal point (or in the vicinity thereof).

In another configuration, the surface of the main body has or is a lateral surface having an ellipsoidal basic shape, said lateral surface being covered with the reflection layer. This enables simple provision of the at least one first and second focal points. However, the shape is not restricted thereto and may e.g. also be a spherical section shape or a freeform shape.

In one configuration, moreover, the surface of the main body has a planar surface ("base surface") extending in a principal plane, the focal points lying in said base surface. Such a lens can be produced particularly simply. The base surface can also be regarded as a planar cut surface along a principal plane of an ellipsoid, in particular ellipsoid of revolution.

In one configuration, furthermore, the surface of the main body has a cut base surface extending partly in a principal plane, in which base surface at least one focal point lies on or in the vicinity of edges (called "cut edges" even though they need not be produced by a cutting process). This enables a higher flexibility in the direction of the light course in the main body. The cut base surface can also be regarded as a planar cut surface along a principal plane of an ellipsoid, in particular ellipsoid of revolution, at which at least one, preferably two, further cut(s) is (are) made in the remaining ellipsoid.

In one development thereof, at least one first focal point and one second focal point, in particular all focal points, lie on or in the vicinity of edges or cut edges.

In one configuration, moreover, the surface of the main body has a beveled base surface, in which base surface complementary or assigned first and second focal points lie on mutually beveled regions. This also enables a higher flexibility in the direction of the light course in the main body, and it is possible to avoid fitting the phosphor element over a cut edge.

The beveled regions can merge into one another for example at a ("cut") edge. Alternatively, the beveled base surface may have e.g. a basic shape of a pointed or truncated cone envelope.

In one configuration, furthermore, the main body has a coupling-out region for coupling out light, which coupling-out region has at least one second focal point. This enables a small-area coupling-out region which enables a high luminance of the coupled-out light. A coupling-out optical unit, e.g. a light guiding element, a lens, a concentrator, etc., can be attached to the coupling-out region. The coupling-out optical unit can be integrated into the main body.

In another configuration, the reflection layer has at least one window which enables light incidence on at least one first focal point. As a result, primary light can be radiated onto the at least one phosphor element in a simple manner in particular via the lateral surface of the main body. In particular, the reflection layer can thus be configured in a simple manner (e.g. without wavelength differentiation).

In one development that can be implemented particularly simply, the window is a clear window, that is to say transmits light directly onto the main body. Consequently, the main body is in particular exposed or not coated in the region of the window.

In one particularly effective development, the window has an antireflection coating.

In one configuration, furthermore, the lens has, in the region of the at least one window, a focusing region for focusing incident light onto a first focal point, said focusing region deviating locally from a basic shape of the surroundings of the window. As a result, e.g. for setting a size and/or shape of the light spot at the focal point, a (primary) light beam incident on the phosphor element through the focusing region can be shaped flexibly. In particular, the light beam passing in the main body can thus also be aligned in a manner dependent on an angle of incidence of the light incident on the focusing region from outside. The focusing region may be shaped in particular in an outwardly projecting or elevated fashion, in particular may be convexly shaped.

The lens is not restricted to the provision of one focal point and/or one phosphor element and can have, for example, a plurality of first focal points and/or a plurality of phosphor elements.

In this regard, in one development, the lens has a plurality of phosphor elements, wherein the plurality of phosphor elements are distributed rotationally symmetrically about a rotation axis of the lens, e.g. in a manner angularly offset about a longitudinal axis or axis of symmetry on the base surface. In this case, the phosphor elements can be shaped and/or distributed in particular in a ring-sector-shaped fashion. A luminous flux can be increased as a result.

In another development, the lens has at least one phosphor element which has or can have a plurality of, in particular spatially separated, first focal points, that is to say can in particular also be irradiated by a plurality of, in particular spatially separated, (primary) light beams. Such a development may be producible particularly simply, for example. By way of example, the at least one phosphor element may be exactly one phosphor element, which is arranged e.g. in a ring-sector-shaped fashion, in particular in a semicircular fashion, e.g. on the base surface.

A plurality of light beams incident on the main body may comprise (primary) light having an identical and/or different wavelength or spectral composition.

In another configuration, the lens has a plurality of first focal points and a plurality of phosphor elements, wherein the phosphor elements bear against contact regions having at least one respective first focal point. As a result, light can be coupled out at a plurality of coupling-out regions, which increases a luminous flux and/or, by means of an irradiation of phosphor elements having different phosphors, allows a selective selection of the color or of a color combination of the coupled-out light.

The material of the main body may have a homogeneous refractive index. Alternatively, the material of the main body may have a locally changing refractive index. The material of the main body may then be, in particular, a gradient material, and the main body may be, in particular, a so-called GRIN body or gradient-index optical unit.

Another aspect of the present invention is directed to a lighting device, comprising at least one lens as described above and at least one light source, in particular semiconductor light source, for radiating primary light onto at least one first focal point through the main body of the lens, wherein the at least one phosphor element arranged at said at least one first focal point is designed to convert the primary light at least partly (i.e. in a partly converting or full converting fashion) into secondary light having a different wavelength.

The lighting device affords the same advantages as the lens and can be configured analogously. The at least one (primary or excitation) light beam passing through the main body is focused in particular onto an associated first focal point (including, if appropriate, a focal spot) at which a phosphor element is situated. Said focal point can be, in particular, a selected or realized focal point from a group of possible focal points provided structurally by the lens.

By way of example, a plurality of different (e.g. spatially separated and/or differently oriented) (primary) light beams can be radiated onto the main body of the lens and thus be directed through the main body onto a plurality of spatially separated first focal points. These focal points can be assigned to different phosphor elements and/or be assigned at least in groups to a common phosphor element. By way of example, a plurality of first focal points can be generated or realized at a common, extended phosphor element. A plurality of different (primary) light beams can be radiated onto the main body in particular through respective windows or a common window at least in respect of groups.

In one configuration, the lighting device comprises a plurality of lenses, in particular arranged in a matrix-shaped fashion. An increased luminous flux can thus be generated. Alternatively or additionally, this provides a simple possibility for generating respectively coupled-out light having different colors, e.g. by the provision of at least two lenses with phosphor elements having different phosphors. This also provides a particularly simple possibility for the incidence of primary light having different spectral widths or different wavelengths (which, however, can also be realized, in principle, in the case of a single lens).

In one configuration for a lighting device comprising a lens having a main body having a coupling-out region having at least one second focal point, in particular, a coupling-out optical unit is arranged at at least one coupling-out region. The at least one coupling-out optical unit may be spaced apart from the lens, in particular the main body thereof. For emergence of light or coupling-out of light from the lens in a manner as free of losses as possible, the at least one coupling-out optical unit bears on the main body or makes contact therewith. For coupling out light in a manner particularly free of losses and for stable and simple handling, the at least one coupling-out optical unit is integrated into the lens, in particular the main body thereof. Such integration can be achieved e.g. by means of a common mold for glass or plastic.

Identical or identically acting elements may be provided with identical reference signs in different drawings for the sake of clarity.

DETAILED DESCRIPTION OF THE DRAWINGS

Figure 1:
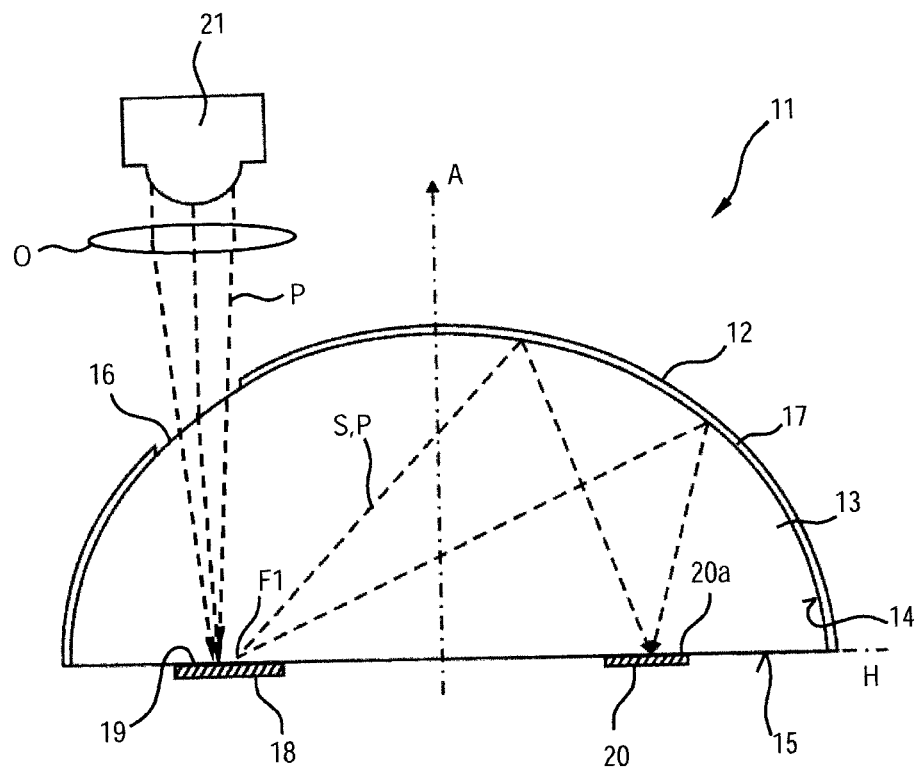
FIG. 1 shows, as a sectional illustration in side view, a first lighting device comprising a lens in accordance with a first exemplary embodiment.

FIG. 1 shows a first lighting device 11 comprising a lens 12 in accordance with a first exemplary embodiment. The lens 12 has a main body 13 embodied as a solid body composed of a solid transparent material, e.g. glass or plastic.

The main body 13 has two conceptually different surfaces, namely a lateral surface 14 having an ellipsoidal basic shape and a planar base surface 15. The base surface 15 extends in a principal plane H of the ellipsoidal basic shape of the lateral surface 14. The main body 13 thus has a circularly symmetrical axis A of symmetry.

The lateral surface 14 is covered for the most part, i.e. apart from a window 16, with an internally reflecting reflection layer 17, which is embodied such that it is reflective in the direction of the main body 13. The base surface 15, by contrast, is not covered by the reflection layer 17 and is therefore exposed. A first focal point F1 and a second focal point F2 lie in or on the base surface 15. The exact position of the first focal point F1 and of the second focal point F2 on the base surface 15 is determined by both the form of the reflection layer 17 and e.g. also the refraction property of the main body 13.

Furthermore, a phosphor element in the form of a phosphor lamina 18 is applied areally on the base surface 15, to be precise in a contact region 19 having the first focal point F1. The phosphor lamina 18 can be applied by adhesive bonding, for example. Alternatively, the phosphor element may be applied e.g. by printing or spraying, etc.

Furthermore, on the base surface 15, a coupling-out optical unit 20 is fitted at a coupling-out region 20a, to be precise at the location of the second focal point F2. The coupling-out optical unit 20 serves for coupling out and guiding light present at the second focal point F2. The coupling-out optical unit 20, e.g. an optical waveguide or an optical concentrator, may make contact with the base surface 15, e.g. may be pressed or adhesively bonded onto it, or may be embodied integrally or in one piece with the main body 13, e.g. may form a region of the main body 13.

The lighting device 11 also comprises a primary light source in the form of a semiconductor light source 21 (comprising e.g. at least one laser or light emitting diode), which is designed and arranged for the purpose of radiating (primary) light P emitted by it into the main body 13 from the outside through the window 16. The primary light can be blue light, for example. For this purpose, an, in particular collimating, optical unit O can be disposed downstream of the semiconductor light source 21.

The primary light P is focused onto the first focal point F1 by the lens-shaped main body 13. Since the phosphor lamina 18 bears on the main body 13 without a gap, it is irradiated by the primary light P largely in a manner free of losses. The phosphor lamina 18 converts the primary light P at least partly into at least one secondary light S having a longer wavelength, e.g. into yellow secondary light S.

Secondary light S converted by the phosphor lamina 18 and, if appropriate, non-converted primary light P are radiated at least substantially non-directionally directly into the main body 13. The reflection layer 17 is configured here such that it is both reflective to the secondary light S and reflective to the primary light P, with the result that the light emitted by the phosphor lamina 18, in particular mixed light P, S, is reflected onto the second focal point F2 and is coupled out there by means of the coupling-out optical unit 20. The coupled-out mixed light P, S can be white mixed light, in particular. In particular for the case where the phosphor lamina 18 also comprises a blue-red converting phosphor, the mixed light may be a warm-white mixed light.

The main body 13 and/or the lens 12 may be embodied in a shape-related manner rotationally symmetrically about the axis A of symmetry. The lighting device 11 may have only the one window 16, only the one semiconductor light source 21 and only the one phosphor lamina 18.

Alternatively, the main body 13 and/or the lens 12 may be embodied circularly symmetrically (i.e. continuously) for example by 180° or less about the axis A of symmetry. By way of example, the phosphor lamina 18 may be embodied as one ring-sector-shaped phosphor lamina 18 extended by 180° or less. The lens 12 may furthermore have one correspondingly circularly symmetrically extended window 16 or a plurality of windows 16 arranged rotationally symmetrically (i.e. arranged in a manner spaced apart in angular steps) about the axis A of symmetry. As a result, a plurality of primary light beams can be generated at respective first focal points F1 and light S, P can be coupled out at a plurality of second focal points F2. This may increase a luminous flux, e.g. proportionally to a number of first focal points F1 realized, in particular if a plurality of semiconductor light sources 21 are used.

In another alternative, the main body 13 and/or the lens 12 may be embodied rotationally symmetrically for example by 180° or less about the axis A of symmetry. The lighting device 11 may then comprise, in particular, a plurality of phosphor laminae arranged in a manner spaced apart about the axis A of symmetry and having an identical phosphor or a different phosphor (e.g. blue-yellow converting phosphor in one phosphor lamina 18 and yellow-red converting phosphor in another phosphor lamina 18).

The light device 11 may comprise a plurality of lenses 12 and associated elements, e.g. 20, 21 arranged in particular in a matrix-shaped manner. The lenses 21, etc. are possibly arranged alongside one another in particular in a common plane (here e.g. in a plane perpendicular to the plane of the drawing and corresponding to the base surface 15). This enables an increased luminous flux.

Figure 2:
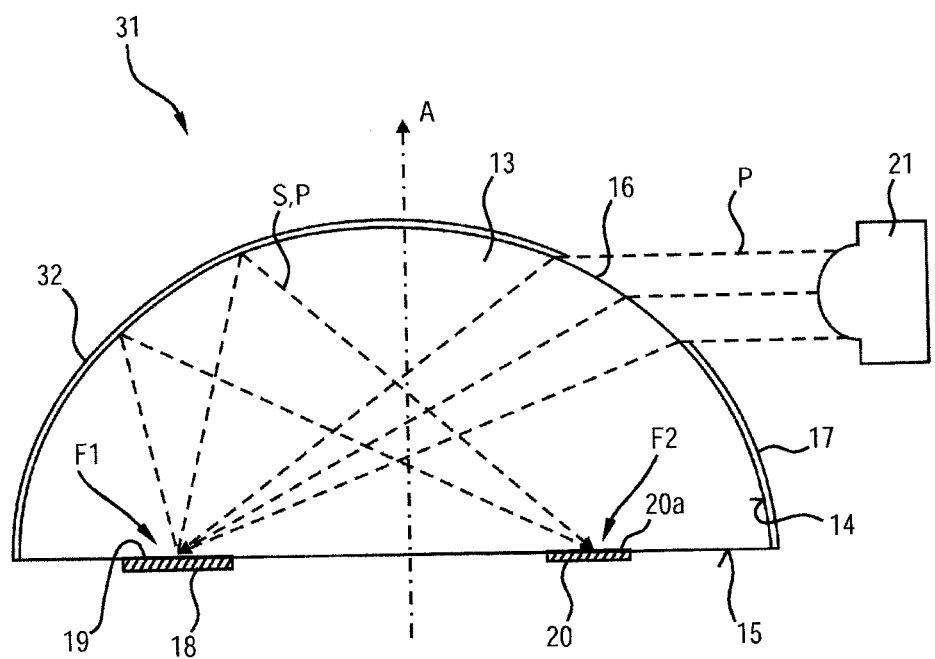
FIG. 2 shows, as a sectional illustration in side view, a second lighting device comprising the lens in accordance with a second exemplary embodiment.

FIG. 2 shows, as a sectional illustration in side view, a second lighting device 31 comprising the lens 32 in accordance with a second exemplary embodiment. The light device 31 exhibits a basic construction similar to the light device 11. Whereas, however, in the case of the light device 11, the primary light P is radiated in at least approximately vertically through a window 16 arranged at least approximately above the first focal point F1, the primary light P in the case of the lighting device 31 is radiated in at least approximately horizontally through a window 16 arranged at least approximately above the second focal point F2.

Figure 3:
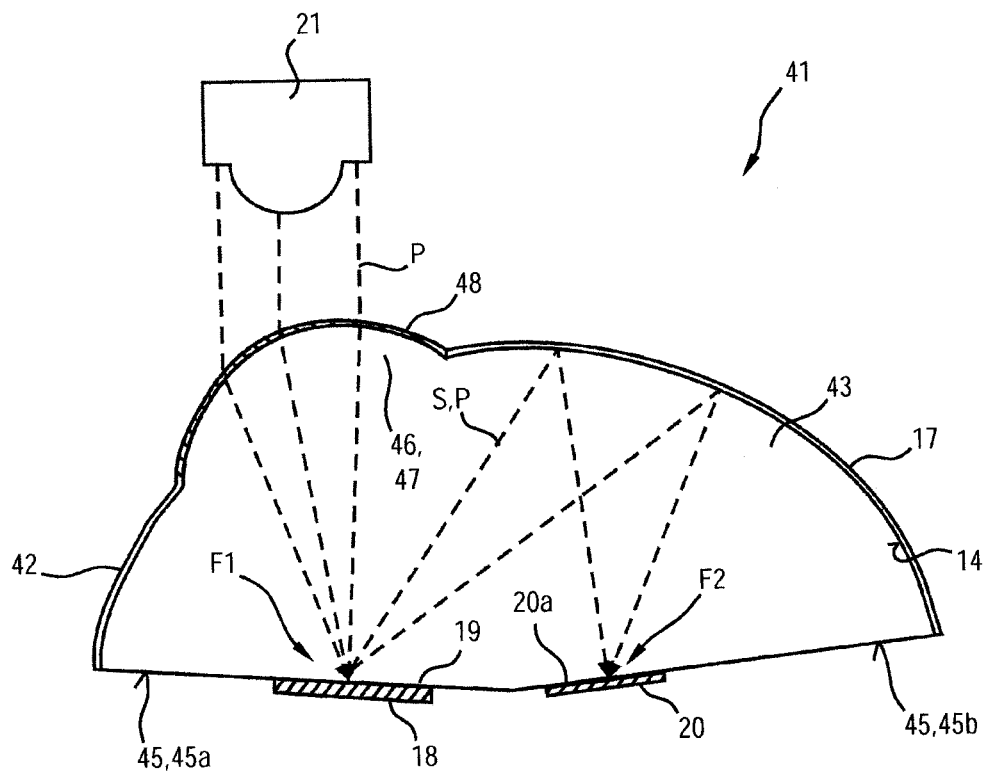
FIG. 3 shows, as a sectional illustration in side view, a third lighting device comprising a lens in accordance with a third exemplary embodiment.

FIG. 3 shows, as a sectional illustration in side view, a third lighting device 41 comprising a lens 42 in accordance with a third exemplary embodiment. The third lighting device 41 is constructed similarly to the lighting device 11, that now comprises a main body 43 whose base surface 45 is not planar, but rather conically beveled. The focal points F1, F2 lying in the base surface 45 lie on, in this illustration, mutually beveled regions 45a and 45b, respectively, of the base surface 45. As a result, a course of the light S, P emitted by the phosphor lamina 18 can be shaped more flexibly, in particular for the direction onto the coupling-out optical unit 20.

Moreover, the main body 43 has, in the region of the window 46, a focusing region 47 for focusing the incident primary light P onto the first focal point F1, said focusing region deviating locally from the ellipsoidal basic shape. The focusing region 47 is embodied as a convex, lens-shaped elevation and is coated here with an antireflection coating 48 in order to increase the luminous efficiency.

Figure 4:
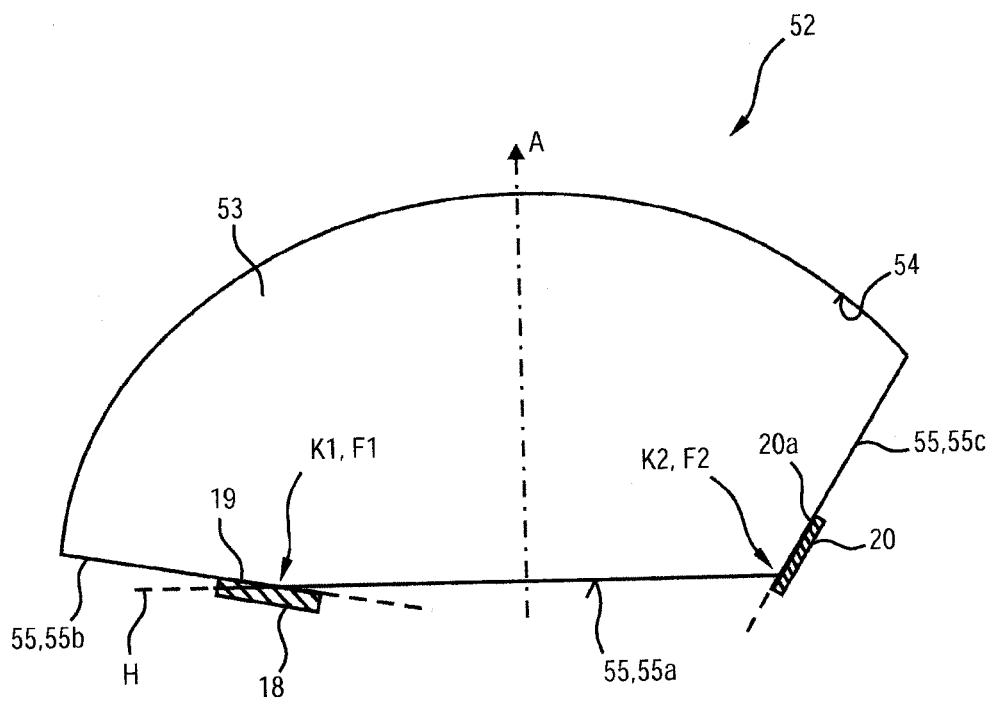
FIG. 4 shows, as a sectional illustration in side view, a main body of a lens in accordance with a fourth exemplary embodiment.

FIG. 4 shows, as a sectional illustration in side view, a main body 53 of a lens 52 in accordance with a fourth exemplary embodiment. The main body 53 still has an ellipsoidal lateral surface 54. The base surface 55 is multiply beveled and has a partial region 55a lying in the principal plane H. The base surface 55 is furthermore shaped in a cut fashion and has cut edges K1 and K2, at which the partial region 55a merges into partial regions 55b and 55c, respectively, which are beveled relative thereto. The partial regions 55b and 55c have a different angle with respect to the principal plane H. The focal points F1 and F2 and thus the phosphor lamina 18 and the coupling-out optical unit lie on the cut edges K1 and K2.

Although the invention has been described and illustrated more specifically in detail by the exemplary embodiments shown, nevertheless the invention is not restricted thereto and other variations can be derived therefrom by the person skilled in the art, without departing from the scope of protection of the invention.

The invention claimed is:

1. A lens comprising a transparent main body, wherein:
    a surface of the main body is at least partly covered with an internally reflecting reflection layer,
    the lens has at least one first focal point and at least one second focal point,
    at least the first focal point lies at least partly on a non-covered surface region of the main body, and
    at least one phosphor element bears against the main body at a contact region having at least one first focal point.

2. The lens as claimed in claim 1, wherein the reflection layer is reflective at least to secondary light generated by the at least one phosphor element.

3. The lens as claimed in claim 1, wherein the surface of the main body has a lateral surface having an ellipsoidal basic shape, said lateral surface being covered with the reflection layer, and a planar base surface extending in a principal plane (H), the focal points lying in said base surface.

4. The lens as claimed in claim 1, wherein the surface of the main body has a lateral surface having an ellipsoidal basic shape, said lateral surface being covered with the reflection layer, and a cut base surface extending partly in a principal plane, in which base surface at least one focal point lies on or in the vicinity of cut edges.

5. The lens as claimed in claim 1, wherein the surface of the main body has a lateral surface having an ellipsoidal basic shape, said lateral surface being covered with the reflection layer, and a beveled base surface, in which base surface complementary first and second focal points lie on mutually beveled regions.

6. The lens as claimed in claim 1, wherein the main body has a coupling-out region having at least one second focal point.

7. The lens as claimed in claim 1, wherein the reflection layer has at least one window which enables light incidence on at least one first focal point.

8. The lens as claimed in claim 7, wherein the lens has, in the region of the at least one window, a focusing region for focusing incident light onto a first focal point, said focusing region deviating locally from a basic shape of the surroundings of the window.

9. The lens as claimed in claim 1, wherein the lens has a plurality of first focal points and a plurality of phosphor elements, wherein the phosphor elements bear against contact regions having at least one respective first focal point.

10. A lighting device, comprising:
at least one lens as claimed in claim 1, and
at least one light source, for radiating primary light onto at least one first focal point through the main body of the lens,
wherein the at least one phosphor element arranged at said at least one first focal point is adapted to convert the primary light at least partly into secondary light having a different wavelength.

11. The lighting device as claimed in claim 10, wherein the lighting device comprises a plurality of lenses.

12. The lighting device as claimed in claim 10, wherein said at least one lens has in the main body a coupling-out region having at least one second focal point, and wherein a coupling-out optical unit is arranged at at least one said coupling-out region.

13. The lighting device of claim 10, wherein said at least one light source is a semiconductor light source.

14. The lighting device of claim 11, wherein said plurality of lenses are arranged in a matrix fashion.

* * * * *